J. BIBER.
RESILIENT VEHICLE WHEEL.
APPLICATION FILED SEPT. 9, 1920.
1,365,447.
Patented Jan. 11, 1921.
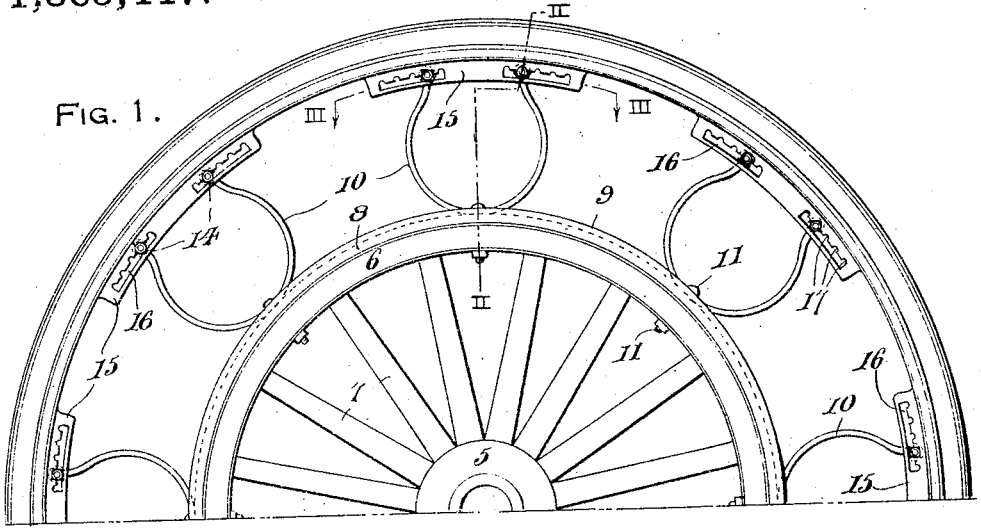
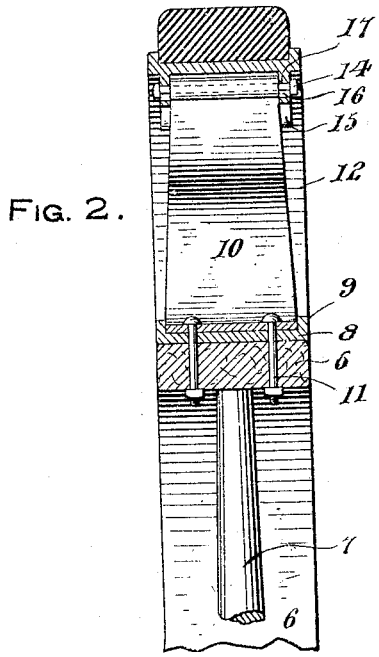
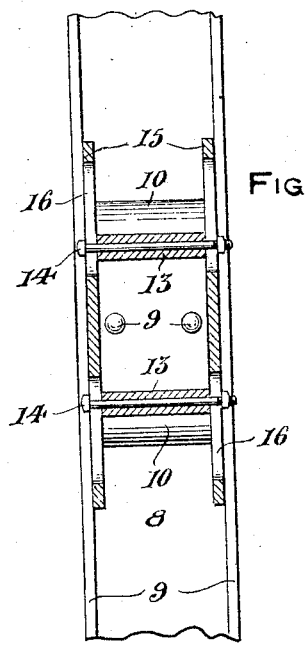
Inventor
J. Biber
By A. W. Wilson
Attorney

UNITED STATES PATENT OFFICE.

JOSEF BIBER, OF LORAIN, OHIO.

RESILIENT VEHICLE-WHEEL.

1,365,447.  Specification of Letters Patent.  Patented Jan. 11, 1921.

Application filed September 9, 1920. Serial No. 409,123.

*To all whom it may concern:*

Be it known that I, JOSEF BIBER, a citizen of Poland, residing at Lorain, in the county of Lorain and State of Ohio, have invented certain new and useful Improvements in Resilient Vehicle-Wheels, of which the following is a specification.

This invention relates to certain new and useful improvements in resilient vehicle wheels of the cushioned inner rim type.

The principal object of the invention is to provide a wheel of the above kind which is of such simple and durable construction as to meet with all the requirements for a successful commercial use.

A further object is to provide a wheel of the above kind wherein the yieldable connection between the inner and outer rims is provided by means of a series of spaced sheet metal springs having their bases rigidly fastened to the inner rim and their free ends adjustably fastened to the outer rim whereby the resiliency of the wheel may be regulated in accordance with the load to be carried thereby.

Other objects will appear as the nature of the invention is better understood, and the same consists in the novel form, combination and arrangement of parts hereinafter more fully described, shown in the accompanying drawing and claimed.

In the drawing, wherein like reference characters designate corresponding parts throughout the several views, Figure 1 is a side elevational view of substantially one-half of a vehicle wheel constructed in accordance with the present invention, Fig. 2 is an enlarged sectional view thereof taken substantially upon line II—II of Fig. 1, and Fig. 3 is a similar view taken upon line III—III of Fig. 1.

Referring more in detail to the several views, the present invention includes the usual hub 5 rigidly connected in any suitable manner to an endless rigid inner rim 6 through the office of radial spokes 7 whereby said rim 6 is concentric with and surrounds the hub 5.

The inner rim 6 has a metal band 8 fastened thereon, and said band is provided with flanges 9 to form an endless seat within which the springs 10 are secured by means of bolts 11. The springs 10 are of substantially U-shaped formation as shown in Fig. 1 with the bolts 11 passing through the central portions thereof as well as also through the band 8 and rim 6 as seen in Fig. 2, whereby all of these parts are held in position.

An outer rim 12 surrounds the inner rim 6 and is held normally spaced from and concentric with the latter by the springs 10 whose free end portions are provided with sleeves 13 through which transversely arranged bolts 14 extend. The outer rim 12 is provided at intervals with inwardly extending pairs of flanges 15, each having a pair of circumferentially elongated slots 16 with one wall thereof notched as at 17, the bolts 14 being arranged in the slots 16 as seen in Figs. 1 and 3. By flexing the ends of springs 10, and loosening the nuts upon the ends of the bolts 14, said bolts may be withdrawn from the notches 17 and slid to the desired position in the slots 16, whereupon said bolts may be allowed to enter the desired adjacent notch 17 and there secured by tightening the nuts. It will be apparent that the stiffness of the springs 10 will be varied according to the relative positions of the ends of said springs and the resiliency of the wheel thus regulated.

It is believed that the construction and operation of the invention will be readily understood and appreciated from the foregoing description by those skilled in the art.

Minor changes may be made without departing from the spirit and scope of the invention as claimed.

What is claimed as new is:—

1. A spring wheel of the cushioned inner rim type including, in combination with a rigid inner rim having a hub, and an outer rim spaced from and surrounding said inner rim, of resilient sheet metal springs of substantially U-shape in elevation having their intermediate portions rigidly fastened to the inner rim and their ends circumferentially adjusted relative to and connected with the outer rim whereby resiliency of the wheel is regulated.

2. In combination with an inner rim having a hub and an outer rim arranged spaced from and surrounding the inner rim, of a series of spaced U-shaped sheet metal springs arranged between said rims, of means rigidly connecting the central portions of said springs to the inner rim, and means connecting the ends of said springs to the outer rim, said last named means being adjustable circumferentially of the wheel whereby the distance between the ends of the springs may be varied by flexing said ends for regulating the resiliency of the wheel.

3. In combination with an inner rim having a hub and an outer rim arranged spaced from and surrounding the inner rim, of a series of spaced U-shaped sheet metal springs arranged between said rims, of means rigidly connecting the central portions of said springs to the inner rim, means connecting the ends of said springs to the outer rim, said last named means being adjustable circumferentially of the wheel whereby the distance between the ends of the springs may be varied by flexing said ends for regulating the resiliency of the wheel, said last named means including pairs of inwardly projecting flanges rigid with the sides of the outer rim and having circumferentially elongated pairs of slots therein, and bolts extending through said slots and attached to the ends of said springs.

4. In combination with an inner rim having a hub and an outer rim arranged spaced from and surrounding the inner rim, of a series of spaced U-shaped sheet metal springs arranged between said rims, of means rigidly connecting the central portions of said springs to the inner rim, means connecting the ends of said springs to the outer rim, said last named means being adjustable circumferentially of the wheel whereby the distance between the ends of the springs may be varied by flexing said ends for regulating the resiliency of the wheel, said last named means including pairs of inwardly projecting flanges rigid with the sides of the outer rim and having circumferentially elongated pairs of slots therein, and bolts extending through said slots and attached to the ends of the springs, one wall of each slot being notched for providing positive adjustment, and the free ends of said springs being provided with sleeves through which said bolts extend.

In testimony whereof I affix my signature.

JOSEF BIBER.

Witnesses:
S. H. WILLIAMS,
ALICE KAY.